US012554258B2

(12) United States Patent
Nguyenquang et al.

(10) Patent No.: US 12,554,258 B2
(45) Date of Patent: Feb. 17, 2026

(54) TRAVELING SYSTEM, TRAVELING METHOD, AND RECORDING MEDIUM RECORDING TRAVELING PROGRAM

(71) Applicant: SHARP KABUSHIKI KAISHA, Osaka (JP)

(72) Inventors: Thinh Nguyenquang, Osaka (JP); Hiroshi Yamauchi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 175 days.

(21) Appl. No.: 18/229,691

(22) Filed: Aug. 3, 2023

(65) Prior Publication Data
US 2024/0061429 A1    Feb. 22, 2024

(30) Foreign Application Priority Data
Aug. 22, 2022   (JP) ................................ 2022-131603

(51) Int. Cl.
*G05D 1/00* (2024.01)
(52) U.S. Cl.
CPC ......... *G05D 1/0212* (2013.01); *G05D 1/0287* (2013.01)
(58) Field of Classification Search
CPC ............... G05D 1/0212; G05D 1/0287; G05D 2105/28; G05D 2107/70; G05D 2109/10; G05D 1/6987; G05D 1/693; G05D 1/0297; G05D 1/0027; G08G 1/22; G08G 1/20
See application file for complete search history.

(56) References Cited

U.S. PATENT DOCUMENTS

| | | | |
|---|---|---|---|
| 11,126,944 B1* | 9/2021 | Aggarwal | G06F 9/4887 |
| 2015/0073589 A1* | 3/2015 | Khodl | G06Q 50/40 |
| | | | 700/218 |
| 2016/0282874 A1 | 9/2016 | Kurata et al. | |
| 2021/0286366 A1 | 9/2021 | Inoue et al. | |
| 2021/0286373 A1* | 9/2021 | Aisu | G08G 1/123 |

(Continued)

FOREIGN PATENT DOCUMENTS

| | | | |
|---|---|---|---|
| JP | H10312217 A | * 11/1998 | |
| JP | 2004280213 A | * 10/2004 | G05D 1/0289 |
| JP | 2005-242489 A | 9/2005 | |

(Continued)

OTHER PUBLICATIONS

English Translation JP2004280213A (Year: 2025).*
English Translation JPH10312217A (Year: 2025).*

*Primary Examiner* — Erin M Piateski
*Assistant Examiner* — Eisen Yim
(74) *Attorney, Agent, or Firm* — ScienBiziP, P.C.

(57) ABSTRACT

This traveling system includes: a setting processing unit that sets a travel route corresponding to each of the plurality of automatic traveling devices; a calculation processing unit that, when a first automatic traveling device interferes with a travel of other automatic traveling devices, calculates an evaluation value representing an influence level that the first automatic traveling device imposes on the travel of the other automatic traveling devices; and a change processing unit that, when the evaluation value calculated by the calculation processing unit is greater than or equal to a threshold, changes the travel route that is set to the first automatic traveling device by the setting processing unit.

9 Claims, 9 Drawing Sheets

(56) References Cited

U.S. PATENT DOCUMENTS

2023/0102760 A1\* 3/2023 Oh .................. B60W 30/18163
  701/28
2025/0036145 A1\* 1/2025 Nørby .................. G05D 1/0289

FOREIGN PATENT DOCUMENTS

| | | |
|---|---|---|
| JP | 2021-144276 A | 9/2021 |
| WO | 2015/068249 A1 | 5/2015 |

\* cited by examiner

| PRODUCT ID | PRODUCT NAME | SHELF ID |
|---|---|---|
| 0001 | PRODUCT A | T1 |
| 0002 | PRODUCT B | T2 |
| 0003 | PRODUCT C | T3 |
| ... | ... | ... |

| UNIT ORDER ID | CUSTOMER ID | ORDERED PRODUCT | QUANTITY | ORDER DATE AND TIME |
|---|---|---|---|---|
| O1 | CUSTOM1 | PRODUCT E | 2 | ... |
| O2 | CUSTOM1 | PRODUCT F | 3 | ... |
| O3 | CUSTOM2 | PRODUCT G | 5 | ... |
| O4 | CUSTOM2 | PRODUCT H | 5 | ... |

| ORDER SET ID | UNIT ORDER ID | SHELF ID |
|---|---|---|
| SET1 | O1, O2, O3, O4 | T3 |
| SET2 | ... | ... |
| ... | ... | ... |

| COUNTER VALUE | EVALUATION VALUE | | |
|---|---|---|---|
| | AGV1 | AGV2 | AGV3 |
| t0 | 0 | 0 | 0 |
| t1 | 1 | 2 | 4 |
| t2 | 2 | 5 | 12 |
| t3 | 3 | 9 | 25 |
| t4 | 4 | 14 | 44 |
| t5 | 5 | 20 | 70 |
| t6 | 6 | 27 | 104 |
| t7 | 7 | 35 | 147 |
| ... | ... | ... | ... |

D4

TRAVELING SYSTEM, TRAVELING METHOD, AND RECORDING MEDIUM RECORDING TRAVELING PROGRAM

INCORPORATION BY REFERENCE

This application is based upon and claims the benefit of priority from the corresponding Japanese Patent Application No. 2022-131603 filed on Aug. 22, 2022, the entire contents of which are incorporated herein by reference.

BACKGROUND

The present disclosure relates to a traveling system, a traveling method, and a recording medium recording a traveling program that cause an automatic traveling device to travel.

Conventionally, there is known a traveling system that causes an automatic traveling device (such as an AGV or an unmanned transport device) to travel to a destination location along a preset travel route. Furthermore, for example, there is also known a system that avoids interference between automatic traveling devices by setting a virtual obstacle on the travel route along which an automatic traveling device travels and preventing other automatic traveling devices from entering the travel route.

However, in the conventional technique, for example, when a large-scale traveling system with a large number of automatic traveling devices is implemented, a phenomenon is likely to occur in which a plurality of automatic traveling devices interfere with each other and stop in their current positions, resulting in a so-called deadlock (or gridlock).

SUMMARY

An object of the present disclosure is to provide a traveling system, a traveling method, and a traveling program that are capable of suppressing the occurrence of a deadlock between a plurality of automatic traveling devices, and improving travel efficiency.

A traveling system according to an aspect of the present disclosure is a traveling system that causes a plurality of automatic traveling devices to each travel to a destination location. The traveling system includes a setting processing unit, a calculation processing unit, and a change processing unit. The setting processing unit sets a travel route corresponding to each of the plurality of automatic traveling devices. When a first automatic traveling device interferes with a travel of other automatic traveling devices, the calculation processing unit calculates an evaluation value representing an influence level that the first automatic traveling device imposes on the travel of the other automatic traveling devices. When the evaluation value calculated by the calculation processing unit is greater than or equal to a threshold, the change processing unit changes the travel route that is set to the first automatic traveling device by the setting processing unit.

A traveling method according to another aspect of the present disclosure is a traveling method that causes a plurality of automatic traveling devices to each travel to a destination location, and causes one or more processors to execute the steps of: setting a travel route corresponding to each of the plurality of automatic traveling devices; calculating, when a first automatic traveling device interferes with a travel of other automatic traveling devices, an evaluation value representing an influence level that the first automatic traveling device imposes on the travel of the other automatic traveling devices; and changing, when the evaluation value is greater than or equal to a threshold, the travel route corresponding to the first automatic traveling device.

A recording medium according to another aspect of the present disclosure is a recording medium recording a traveling program that causes a plurality of automatic traveling devices to each travel to a destination location. The traveling program is for causing one or more processors to execute the steps of: setting a travel route corresponding to each of the plurality of automatic traveling devices; calculating, when a first automatic traveling device interferes with a travel of other automatic traveling devices, an evaluation value representing an influence level that the first automatic traveling device imposes on the travel of the other automatic traveling devices; and changing, when the evaluation value is greater than or equal to a threshold, the travel route corresponding to the first automatic traveling device.

According to the present disclosure, it is possible to provide a traveling system, a traveling method, and a traveling program that are capable of suppressing the occurrence of a deadlock between a plurality of automatic traveling devices, and improving travel efficiency.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of product information that is used in the traveling system according to the embodiment of the present disclosure.

FIG. 4 is a diagram illustrating an example of order information that is used in the traveling system according to the embodiment of the present disclosure.

FIG. 5 is a diagram illustrating an example of transport information that is used in the traveling system according to the embodiment of the present disclosure.

DETAILED DESCRIPTION

An embodiment of the present disclosure will be described below with reference to the accompanying drawings to facilitate understanding of the present disclosure. The following embodiment is an example in which the present disclosure is embodied, and does not limit the technical scope of the present disclosure.

Traveling System 10

Figure 1:
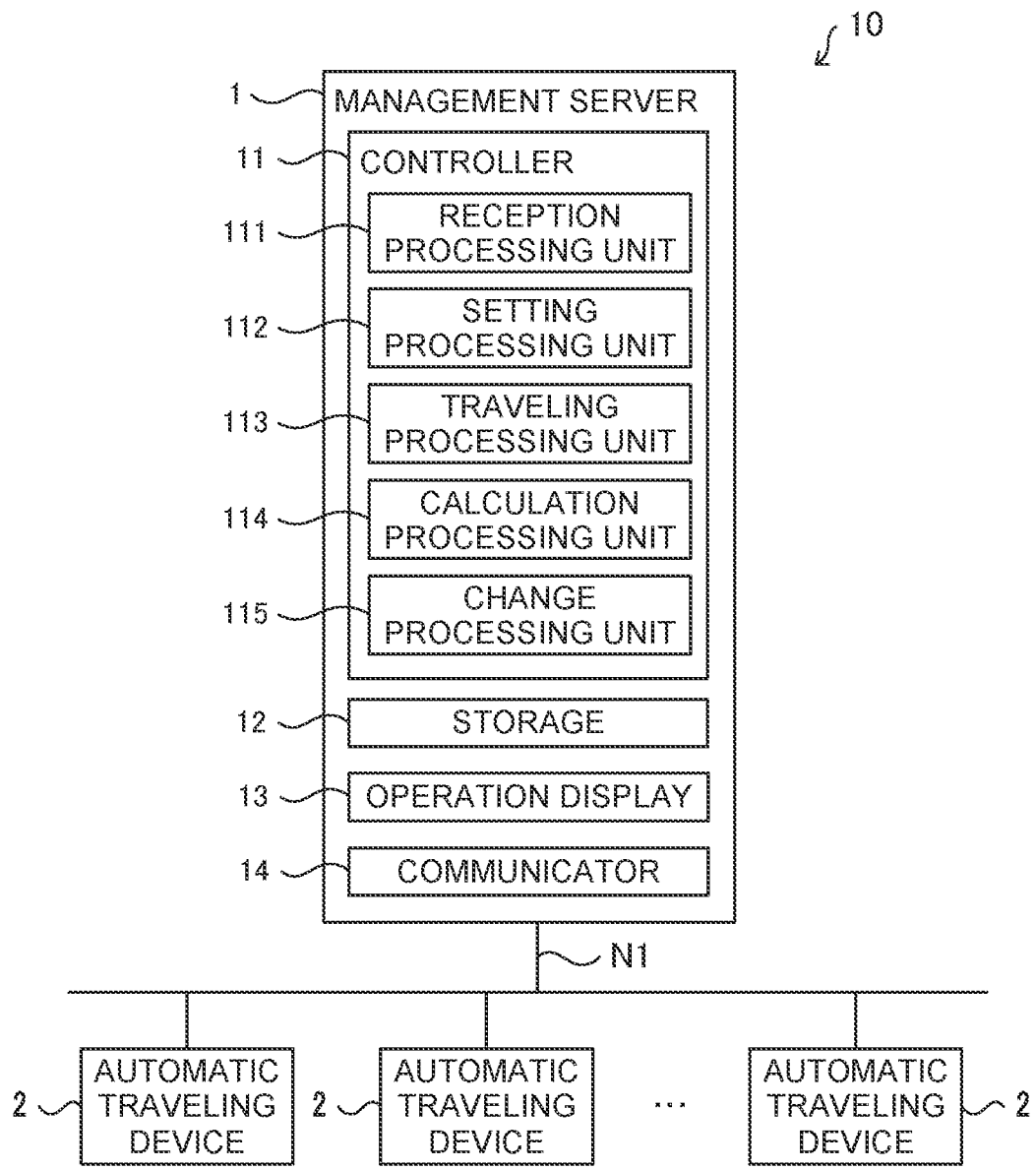
FIG. 1 is a block diagram illustrating a configuration of a traveling system according to an embodiment of the present disclosure.

As illustrated in FIG. 1, a traveling system 10 according to an embodiment of the present disclosure includes a management server 1 and automatic traveling devices 2 (also referred to as AGVs or unmanned transport devices). The management server 1 and the automatic traveling devices 2 can communicate with each other via a communication network N1, such as a wireless LAN.

The traveling system 10 is a system that sets a plurality of paths along which the automatic traveling devices 2 can travel, and specifies, from among the plurality of paths, a path that an automatic traveling device 2 travels along as a travel route such that a transport target is transported from a storage location to a destination location. The traveling system 10 is applied, for example, to factories, warehouses, and other facilities where products (transport targets) are stored. For example, when the traveling system 10 receives an order for a product from a customer (customer terminal), a travel instruction (transport instruction) is output to an automatic traveling device 2. When the automatic traveling device 2 acquires the travel instruction, it moves to the storage location (storage shelf) of the product, picks up the product, and transports the product to a dispatch area. The customer can place an order for a product by accessing a website (order page) operated by an order server (not shown) using an information processing device (customer terminal) such as a personal computer or a smartphone.

The order server is capable of receiving orders for products from a plurality of customer terminals. The order information that is received is then aggregated and output to the management server 1. The management server 1 manages the operation of each of the plurality of automatic traveling devices 2, and outputs a travel instruction to each of the automatic traveling devices 2 based on the order information. Each of the automatic traveling devices 2 autonomously travel along a travel route that is set in advance based on the travel instruction, picks up the product included in the order information from a storage shelf, and transports the product to a dispatch area. No particular limitations are placed on the autonomous traveling method of the automatic traveling devices 2, and a known method may be employed such as a method using a magnetic tape installed on the floor surface and markers that regulate the travel operation (control information).

In addition, the automatic traveling devices 2 are equipped with, for example, a plurality of containers (receptacles). Each container holds a product ordered by a customer, which enables a single pick-up travel (travel from a standby location to the dispatch area via the shelves) to transport the products for a plurality of customers at one time. For example, in a case where the automatic traveling devices 2 are equipped with two containers, the automatic traveling devices 2 can transport the products ordered by two customers at one time. The management server 1 outputs, to each automatic traveling device 2, a travel instruction corresponding to the order information of one or more customers.

Figure 2:
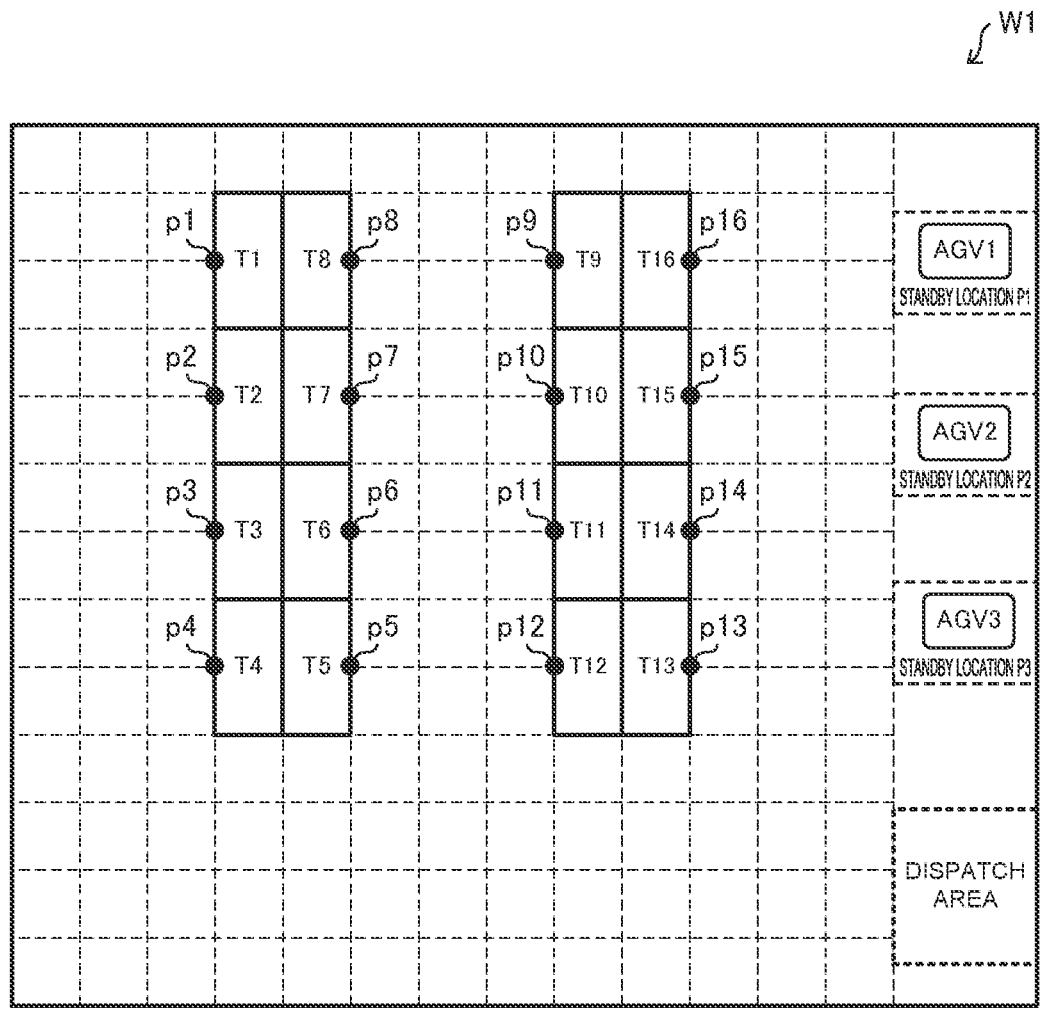
FIG. 2 is a diagram schematically illustrating a configuration of a facility to which the traveling system according to the embodiment of the present disclosure is applied.

FIG. 2 shows an example of a facility W1 to which the traveling system 10 is applied. In the facility W1 illustrated in FIG. 2, a plurality of storage shelves (storage locations) are arranged on which products (transport targets) are stored. FIG. 2 illustrates an example of 16 storage shelves T1 to T16. The locations (pick-up locations p1 to p16) from which the automatic traveling devices 2 pick up products are set to each of the storage shelves T1 to T16.

Furthermore, in the facility W1, standby locations of the automatic traveling devices 2 are set. For example, in the facility W1, a standby location P1 where AGV1 waits, a standby location P2 where AGV2 waits, and a standby location P3 where AGV3 waits are set. The automatic traveling devices 2 wait at the predetermined standby locations when a travel instruction is not received from the management server 1.

When the automatic traveling devices 2 receive a travel instruction from the management server 1, they move from the standby location to the storage shelf where the ordered product is stored. For example, when AGV1 acquires from the management server 1 a travel instruction containing a product on the storage shelf T1 in the order information, it moves to the pick-up location p1 corresponding to the storage shelf T1 along a preset travel route. Then, upon picking up the ordered product or receiving the ordered product from a worker assigned to pick-up work at the pick-up location p1, AGV1 moves to the dispatch area along a preset travel route.

In the present embodiment, the traveling system 10 corresponds to a traveling system according to the present disclosure. However, the traveling system according to the present disclosure may be configured by the management server 1 alone, or may include one or more configuration elements of the management server 1 and the automatic traveling devices 2.

Management Server 1

As illustrated in FIG. 1, the management server 1 includes a controller 11, a storage 12, an operation display 13, and a communicator 14. The management server 1 is not limited to being a single computer, and may be a computer system in which a plurality of computers operate in conjunction with one another. The various processing executed by the management server 1 may be distributed and executed by one or more processors.

The communicator 14 is a communication interface that connects the management server 1 to the communication network N1 in a wired or wireless manner, and executes data communication with one or more automatic traveling devices 2 via the communication network N1 in accordance with a predetermined communication protocol.

The operation display 13 is a user interface including a display such as a liquid crystal display or an organic EL display which displays various kinds of information, and an operation acceptor such as a mouse, a keyboard, or a touch panel which receives operations.

Figures 8, 9:
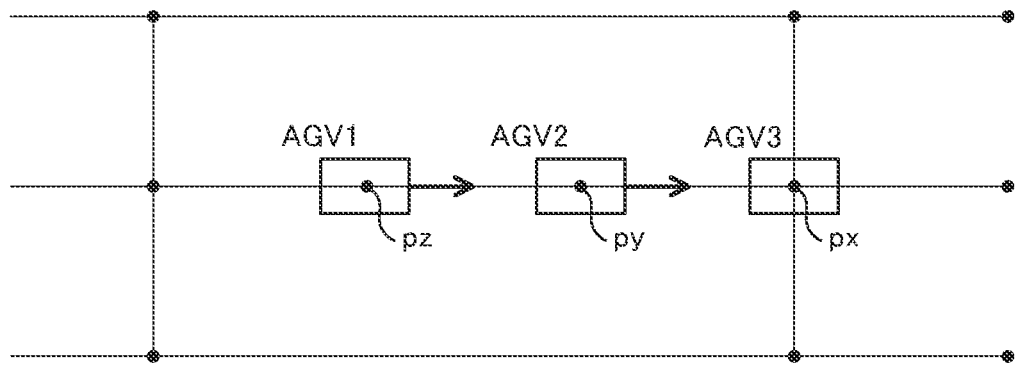
FIG. 8 is a diagram illustrating an example of a deadlock state of the automatic traveling devices according to the embodiment of the present disclosure.
FIG. 9 is a diagram illustrating an example of evaluation values that are calculated in the traveling system according to the embodiment of the present disclosure.

The storage 12 is a non-volatile storage, such as a hard disk drive (HDD) or a solid state drive (SSD), which stores various kinds of information. Specifically, data such as product information D1, order information D2, transport information D3, and evaluation value information D4 is stored in the storage 12. The product information D1 includes information about the products stored in the facility W1. The order information D2 includes information about the orders placed by customers. The transport information D3 includes information about the storage location of the products in the orders placed by customers. The evaluation value information D4 includes information about the evaluation value representing the influence level that an automatic traveling device imposes on the travel of other automatic traveling devices. FIG. 3 is a diagram illustrating an example of the product information D1. FIG. 4 is a diagram illustrating an example of the order information D2. FIG. 5 is a diagram illustrating an example of the transport information D3. FIG. 9 is a diagram illustrating an example of the evaluation value information D4.

As shown in FIG. 3, the product information D1 includes, for each product, information such as "product ID", "product name", and "shelf ID". The "product ID" is the identification information of the product, and the "product name" is the name of the product. The "shelf ID" is the identification information of the storage shelf where the product is stored. In the present embodiment, the shelf ID registers information such as "T1" indicating the storage shelf T1, "T2" indicating the storage shelf T2, and "T3" indicating the storage shelf T3.

The product information D1 is, for example, stored in the storage 12 in advance through a registration operation performed by a manager of the facility W1. Furthermore, the manager can also update the product information D1 as appropriate.

As shown in FIG. 4, the order information D2 includes information for each order, such as "unit order ID", "customer ID", "ordered product", "quantity", and "order date and time". The "unit order ID" is the identification information of a single order. The "customer ID" is the identification information of a customer that has ordered a product. The "ordered product" is the name of the product ordered by the customer. The "quantity" is the number of ordered products. The "order date and time" is date and time information that indicates when the order was received from the customer.

The order information D2 is registered by the controller 11 each time the management server 1 (or the order server) receives an order from a customer.

As shown in FIG. 5, the transport information D3 includes, for each order set obtained by combining unit orders, information such as the corresponding "order set ID", "unit order ID", and "shelf ID". The "order set ID" is the identification information of an order set obtained by combining unit orders. The controller 11 generates an order set by combining unit orders based on information such as the storage location of the products, current position of the automatic traveling devices 2, and operation rules.

The transport information D3 is included in the travel instructions transmitted to the automatic traveling devices 2. For example, when AGV1 acquires a travel instruction including the transport information D3 related to "SET1", AGV1 moves to the position of the shelf ID "T3" included in the transport information D3. Then, AGV1 picks up the products corresponding to each of the unit order IDs "O1", "O2", "O3", and "O4" from the storage shelf T3.

The controller 11 generates the transport information D3 (see FIG. 5) by referring to the product information D1 (see FIG. 3). The details of the evaluation value information D4 (see FIG. 9) will be described below.

Note that, as another embodiment, some or all of the product information D1, the order information D2, the transport information D3, and the evaluation value information D4 may be stored in another server accessible from the management server 1 via the communication network N1. In this case, the controller 11 of the management server 1 may acquire the information from the other server and execute processes such as the traveling processing described below (see FIG. 10).

In addition, the storage 12 stores control programs such as a traveling program that causes the controller 11 to execute the traveling processing (see FIG. 10) described below. For example, the traveling program is non-temporarily recorded on a computer-readable recording medium such as a CD or a DVD, is read by a reading device (not illustrated) such as a CD drive or a DVD drive included in the management server 1, and then stored in the storage 12.

The controller 11 includes control devices such as a CPU, a ROM, and a RAM. The CPU is a processor that executes various types of arithmetic processing. The ROM is a non-volatile storage in which control programs such as a BIOS and an OS for causing the CPU to execute various types of arithmetic processing are stored in advance. The RAM is a volatile or non-volatile storage that stores various types of information, and is used as a temporary storage memory (work area) of the various processing that is executed by the CPU. The controller 11 controls the management server 1 by causing the CPU to execute various control programs stored in advance in the ROM or the storage 12.

However, in the conventional technique, for example, when a large-scale traveling system with a large number of automatic traveling devices is implemented, a phenomenon is likely to occur in which a plurality of automatic traveling devices interfere with each other and stop in their current positions, resulting in a so-called deadlock (or gridlock). FIGS. 6A to 6E illustrate a specific example in which the deadlock phenomenon occurs.

Figure 6A:
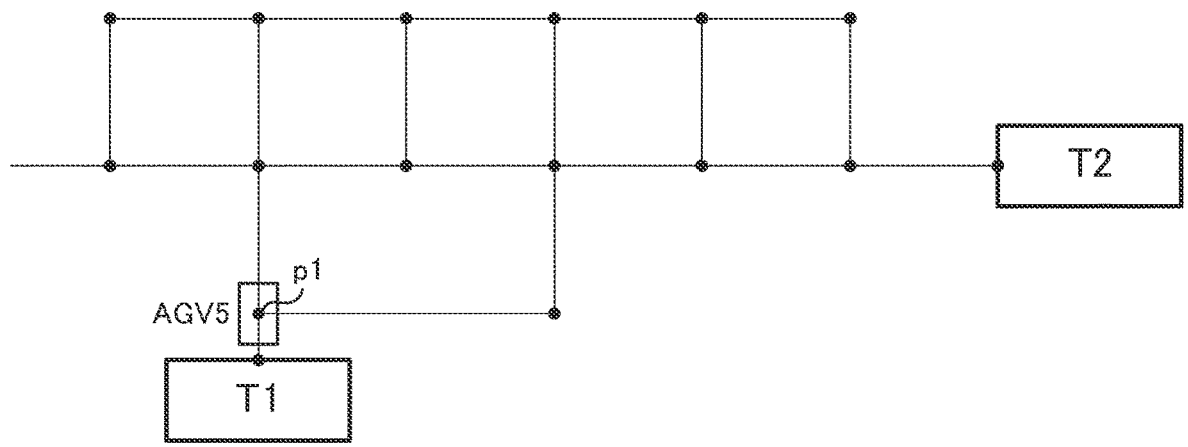
FIG. 6A is a diagram illustrating a specific example of the deadlock phenomenon occurring in the automatic traveling devices.
Figure 6B:
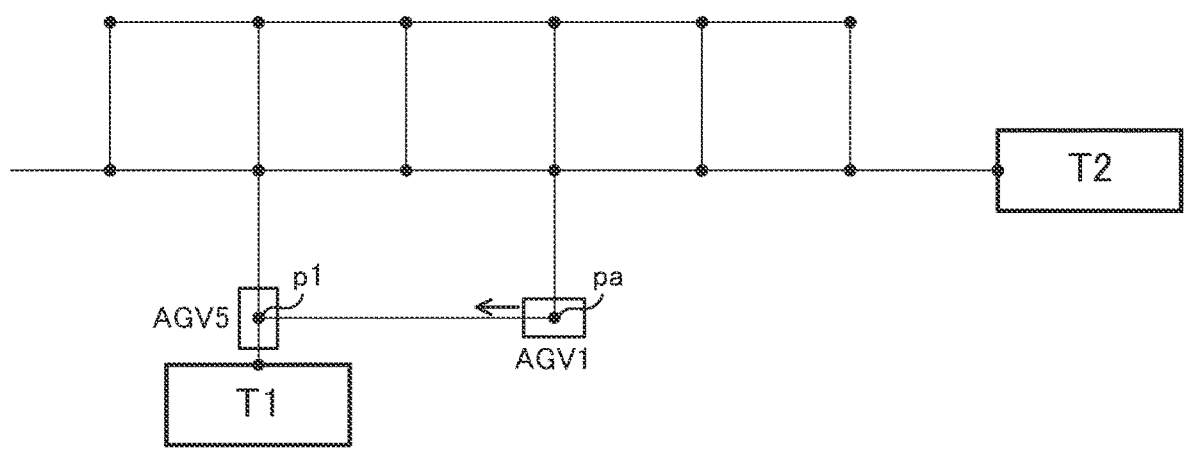
FIG. 6B is a diagram illustrating a specific example of the deadlock phenomenon occurring in the automatic traveling devices.
Figure 6C:
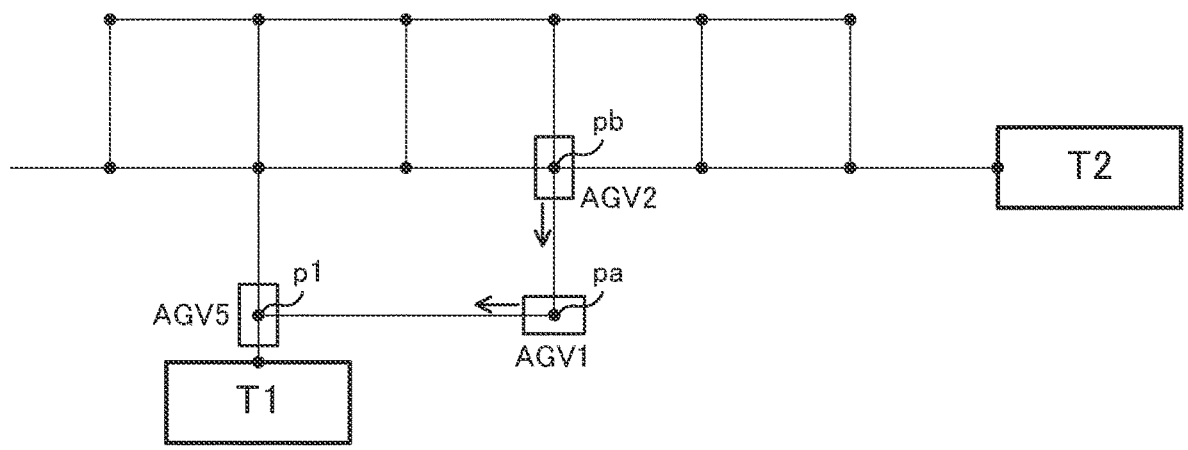
FIG. 6C is a diagram illustrating a specific example of the deadlock phenomenon occurring in the automatic traveling devices.
Figure 6D:
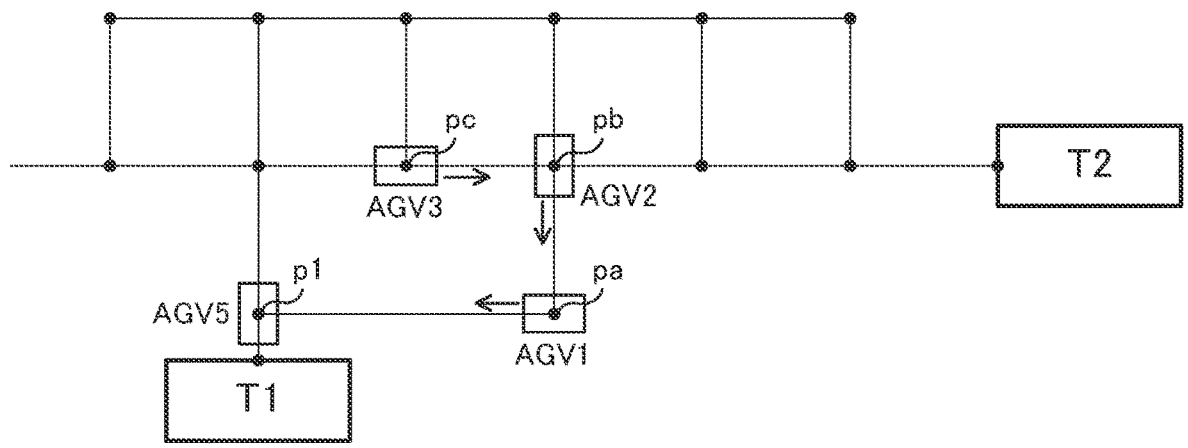
FIG. 6D is a diagram illustrating a specific example of the deadlock phenomenon occurring in the automatic traveling devices.

For example, as shown in FIG. 6A, AGV5 is stopped at the pick-up location p1 of the storage shelf T1. Here, when the destination of AGV1 is set to the storage shelf T1, AGV1 stops at a preceding location pa because AGV5 is currently stopped at the storage shelf T1 (see FIG. 6B). Then, when the destination of AGV2 is set to the storage shelf T1, AGV2 stops at a preceding location pb because AGV1 is currently stopped at the location pa along the travel route (see FIG. 6C). Then, when the destination of AGV3 is set to the storage shelf T1, AGV3 stops at a preceding location pc because AGV2 is currently stopped at the location pb along the travel route (see FIG. 6D). Then, when the destination of AGV4 is set to the storage shelf T1, AGV4 stops at a preceding location pd because AGV3 is currently stopped at the location pc along the travel route (see FIG. 6E).

Figure 6E:
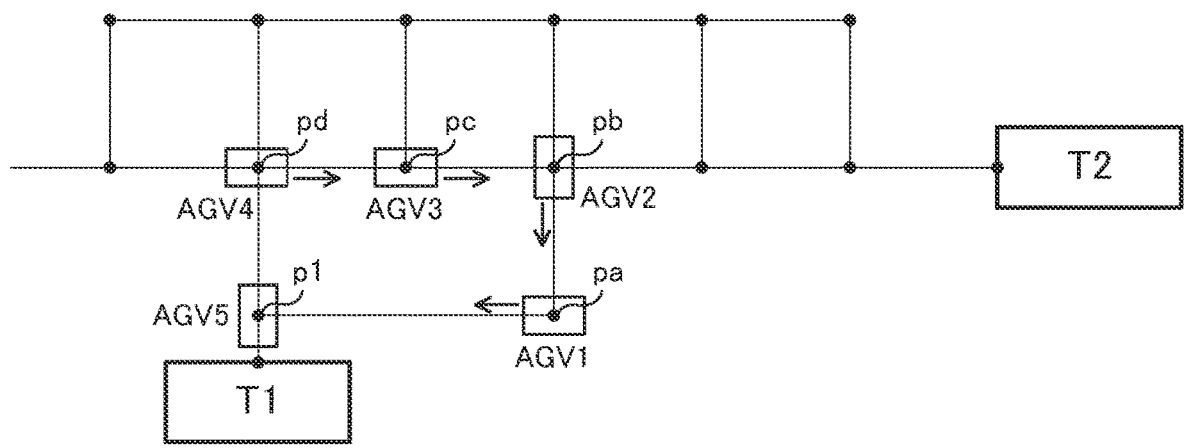
FIG. 6E is a diagram illustrating a specific example of the deadlock phenomenon occurring in the automatic traveling devices.

When the state of FIG. 6E occurs, AGV5 is unable to move, and as a result, a state (a deadlock state) occurs in which each of AGV1 to AGV4 are unable to travel along the set travel route. When such a deadlock state occurs, a problem occurs in that the travel efficiency decreases.

Therefore, the management server 1 according to the present embodiment is provided with a configuration that, as described below, enables the occurrence of a deadlock between the plurality of automatic traveling devices 2 to be suppressed and the travel efficiency to be improved.

Specifically, as illustrated in FIG. 1, the controller 11 includes various processing units such as a reception processing unit 111, a setting processing unit 112, a traveling processing unit 113, a calculation processing unit 114, and a change processing unit 115. The controller 11 functions as the various processing units as a result of the CPU executing various processing according to the traveling program. Moreover, some or all of the processing units may be configured by an electronic circuit. The traveling program may be a program for causing a plurality of processors to function as the processing units.

The reception processing unit 111 receives a transport request (pick-up order) for the products (transport targets) corresponding to the automatic traveling devices 2. Specifically, the reception processing unit 111 receives the order information D2 (see FIG. 4) corresponding to the orders from a plurality of customers. For example, the reception processing unit 111 receives the order information D2 (see FIG. 4) including orders from customers CUSTOM1 and CUSTOM2.

Furthermore, upon receiving the order information D2, the reception processing unit 111 generates the transport information D3. For example, when the reception processing unit 111 receives the order information D2 (see FIG. 4) including four orders (unit orders) from the customers CUSTOM1 and CUSTOM2, the reception processing unit 111 refers to the product information D1 (see FIG. 3) and generates the transport information D3 (see FIG. 5) of "SET1". For example, the reception processing unit 111 generates the transport information D3 by combining, among the plurality of products included in the order information D2, the products stored in the same area into a single order (order set). Moreover, the reception processing unit 111 generates transport information D3 which is assigned to each of the plurality of containers mounted on an automatic traveling device 2.

The setting processing unit 112 sets a travel route from the current location of the automatic traveling device 2 to a storage location (storage shelf) based on the transport request received by the reception processing unit 111.

Specifically, the setting processing unit 112 acquires the location information of all of the automatic traveling devices 2. Each of the automatic traveling devices 2 transmit information such as the current location, traveling speed, direction of movement, and traveling state (traveling or waiting) to the management server 1 in real time. Based on the information transmitted from each automatic traveling device 2, the setting processing unit 112 specifies one automatic traveling device 2 and assigns the transport information D3 to the automatic traveling device 2.

Figure 7:
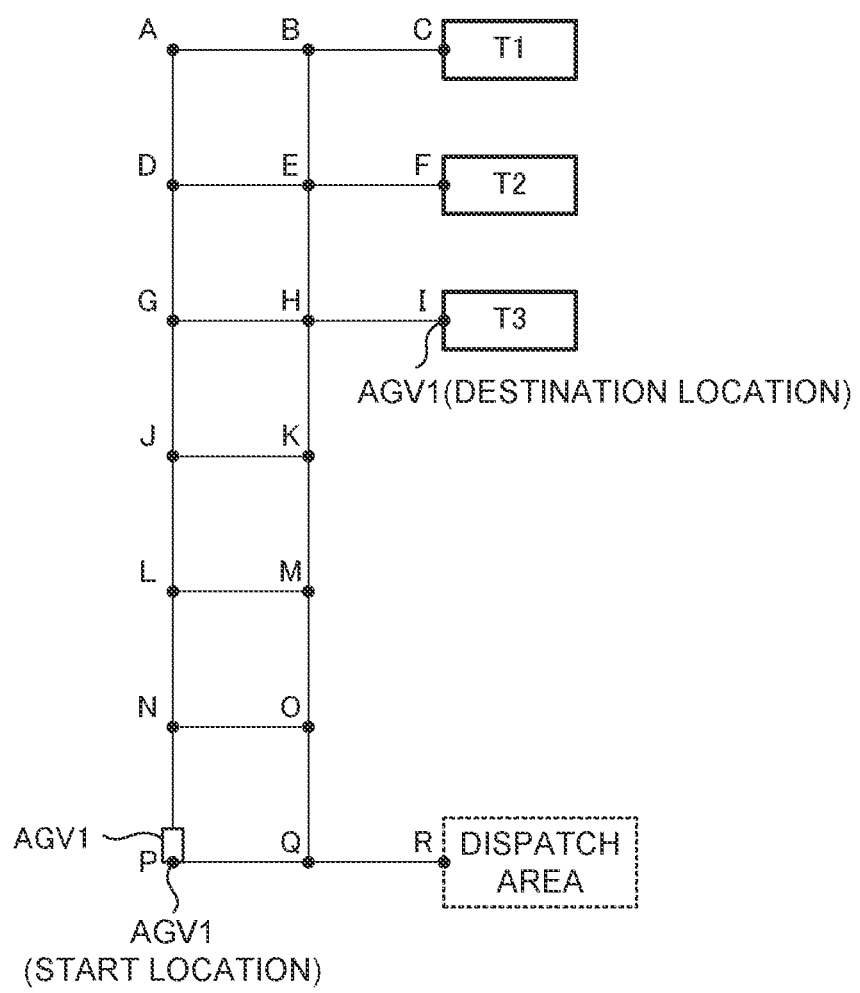
FIG. 7 is a diagram illustrating an example of a travel route according to the embodiment of the present disclosure.

The setting processing unit 112 sets a travel start location and a destination location to the automatic traveling device 2 that has been assigned the transport information D3. FIG. 7 schematically illustrates some areas of the facility W1. The reference signs A to R indicate points within the facility W1, and the straight lines connecting the points indicate paths along which the automatic traveling devices 2 can travel. For example, when the reception processing unit 111 assigns the transport information D3 of "SET1" to AGV1, as shown in FIG. 7, the setting processing unit 112 sets the travel start location of AGV1 to the point P and the destination location to the point I (pick-up location p3).

Upon setting the travel start location and the destination location to AGV1, the setting processing unit 112 sets a travel route from the travel start location to the destination location. Specifically, the setting processing unit 112 performs an operation simulation for all of the automatic traveling devices 2, and sets the travel route and control information that minimizes the sum of the transport times of all of the automatic traveling devices 2.

For example, the setting processing unit 112 first observes the travel status (current position, traveling speed, planned travel route, and estimated arrival time of the planned travel route) of the other automatic traveling devices 2. Then, the setting processing unit 112 performs an operation simulation for all of the automatic traveling devices 2 in parallel, and sets the travel route for AGV1 to move from the point P to the point I such that the sum of the transport times of all of the AGVs is minimized.

Furthermore, the setting processing unit 112 also sets the control information that regulates the operation of the automatic traveling device 2 in association with the markers on the travel route. Specifically, the setting processing unit 112 sets the control information including information that specifies, at each marker position, the direction of movement when advancing toward the next marker position (such as straight ahead, left turn, and right turn), and information such as the traveling speed, acceleration, and whether to stop or turn at each marker position. The markers are provided at each of the points A to R.

The traveling processing unit 113 controls the automatic travel of the automatic traveling devices 2. Specifically, the traveling processing unit 113 outputs to the automatic traveling devices 2 a travel instruction including travel route information, which includes the travel route, and control information. Here, the traveling processing unit 113 outputs the travel route information and the control information to AGV1. Upon acquiring the travel route information and the control information, AGV1 starts traveling along the set travel route. In this way, the traveling processing unit 113 controls the automatic travel by outputting a travel instruction to each of the automatic traveling devices 2.

When an automatic traveling device 2 interferes with the travel of the other automatic traveling devices 2, the calculation processing unit 114 calculates an evaluation value representing an influence level that the automatic traveling device 2 imposes on the travel of the other automatic traveling devices 2. Specifically, when a deadlock occurs as shown in FIG. 6E, the calculation processing unit 114 calculates the evaluation value according to the number of other automatic traveling devices 2 which have the travel interfered with by the automatic traveling device 2. For example, the calculation processing unit 114 calculates the evaluation value so as to increase as the number of other automatic traveling devices 2 which have the travel interfered with by the automatic traveling device 2 increases. For example, when a first AGV interferes with the travel of second AGVs, the calculation processing unit 114 calculates the evaluation value according to the number of second AGVs. Furthermore, when the second AGVs, which have the travel interfered with by the first AGV, further interfere with the travel of third AGVs, the calculation processing unit 114 calculates the evaluation value according to the number of second AGVs and third AGVs. In this way, when the second AGVs, which have the travel interfered with by the first AGV, further interfere with the travel of the third AGVs, that is, when a chain of secondary travel interference occurs, the calculation processing unit 114 calculates the evaluation value by adding the number of AGVs which have the travel interfered with in the chain of secondary travel interference. Note that when tertiary travel interference and quaternary travel interference occurs, the calculation processing unit 114 calculates the evaluation value by adding the corresponding number of AGVs.

Here, a specific example of a calculation method of an evaluation value will be described. In order to simplify the description, FIG. 8 illustrates an example where three AGVs, namely AGV1, AGV2 and AGV3, are in a deadlock state. AGV3 stops at a destination pick-up location px. Furthermore, the pick-up location px is included in the travel route of AGV1 and AGV2. AGV2 stops at a preceding location py because AGV3 is currently stopped at the pick-up location px. AGV1 stops at a preceding location pz because AGV2 is currently stopped at the location py. Therefore, the travel of AGV2 and AGV1 is interfered with by AGV3.

The calculation processing unit 114 updates the counter value at a predetermined frequency, and calculates the evaluation value corresponding to each of the AGVs 1 to 3 at each counter value. FIG. 9 illustrates an example of evaluation value information D4 relating to the calculated evaluation values. The counter value "t0" represents a state where each of the AGVs 1 to 3 are traveling along a set travel route (a state where a deadlock has not occurred).

Counter Value "t1"

The counter "t1" represents a state where each of the AGVs 1 to 3 have stopped on the travel route and a deadlock has occurred (see FIG. 8). At the first counter value "t1" in which the deadlock has occurred, the calculation processing unit 114 calculates "1" as the evaluation value of AGV1. For example, because AGV1 is not interfering with the travel of the other AGVs, the calculation processing unit 114 calculates the minimum value of "1" as the evaluation value of AGV1.

Furthermore, at the counter value "t1", the calculation processing unit 114 calculates "2" as the evaluation value of AGV2. For example, because AGV2 is interfering with the travel of the other AGV1, the calculation processing unit 114 calculates "2" as the evaluation value, which is larger than the evaluation value of AGV1. Specifically, the calculation processing unit 114 calculates "2" as the evaluation value of AGV2, which is the value obtained after adding "1" to the evaluation value "0" of AGV2 at the previous counter value "t0" and the evaluation value "1" of AGV1, which has the travel interfered with by AGV2, at the counter value "t1".

Moreover, at the counter value "t1", the calculation processing unit 114 calculates "4" as the evaluation value of AGV3. For example, because AGV3 is interfering with the travel of the other AVG2 and AGV1, the calculation processing unit 114 calculates "4" as the evaluation value, which is larger than the evaluation value of AGV2. Specifically, the calculation processing unit 114 calculates "4" as the evaluation value of AGV3, which is the value obtained after adding "1" to the evaluation value "0" of AGV3 at the previous counter value "t0", the evaluation value "2" of AGV2, which has the travel interfered with by AGV3, at the counter value "t1", and the evaluation value "1" of AGV1, which has the travel interfered with by AGV3, at the counter value "t1".

Counter Value "t2" At the following counter value "t2", the calculation processing unit 114 calculates "2" as the evaluation value of AGV1. For example, because AGV1 is not interfering with the travel of the other AGVs, the calculation processing unit 114 calculates "2" as the evaluation value of AGV1, which is the value obtained after adding "1" to the evaluation value "1" of AGV1 at the previous counter value "t1".

Furthermore, at the counter value "t2", the calculation processing unit 114 calculates "5" as the evaluation value of AGV2. For example, because AGV2 is interfering with the travel of the other AGV1, the calculation processing unit 114 calculates "5" as the evaluation value, which is larger than the evaluation value of AGV1. Specifically, the calculation processing unit 114 calculates "5" as the evaluation value of AGV2, which is the value obtained after adding "1" to the evaluation value "2" of AGV2 at the previous counter value "t1" and the evaluation value "2" of AGV1, which has the travel interfered with by AGV2, at the counter value "t2".

Moreover, at the counter value "t2", the calculation processing unit 114 calculates "12" as the evaluation value of AGV3. For example, because AGV3 is interfering with the travel of the other AVG2 and AGV1, the calculation processing unit 114 calculates "12" as the evaluation value, which is larger than the evaluation value of AGV2. Specifically, the calculation processing unit 114 calculates "12" as the evaluation value of AGV3, which is the value obtained after adding "1" to the evaluation value "4" of AGV3 at the previous counter value "t1", the evaluation value "5" of AGV2, which has the travel interfered with by AGV3, at the counter value "t2", and the evaluation value "2" of AGV1, which has the travel interfered with by AGV3, at the counter value "t2".

Counter Value "t3" At the following counter value "t3", the calculation processing unit 114 calculates "3" as the evaluation value of AGV1. For example, because AGV1 is not interfering with the travel of the other AGVs, the calculation processing unit 114 calculates "3" as the evaluation value of AGV1, which is the value obtained after adding "1" to the evaluation value "2" of AGV1 at the previous counter value "t2".

Furthermore, at the counter value "t3", the calculation processing unit 114 calculates "9" as the evaluation value of AGV2. For example, because AGV2 is interfering with the travel of the other AGV1, the calculation processing unit 114 calculates "9" as the evaluation value, which is larger than the evaluation value of AGV1. Specifically, the calculation processing unit 114 calculates "9" as the evaluation value of AGV2, which is the value obtained after adding "1" to the evaluation value "5" of AGV2 at the previous counter value "t2" and the evaluation value "3" of AGV1, which has the travel interfered with by AGV2, at the counter value "t3".

Moreover, at the counter value "t3", the calculation processing unit 114 calculates "25" as the evaluation value of AGV3. For example, because AGV3 is interfering with the travel of the other AVG2 and AGV1, the calculation processing unit 114 calculates "25" as the evaluation value, which is larger than the evaluation value of AGV2. Specifically, the calculation processing unit 114 calculates "25" as the evaluation value of AGV3, which is the value obtained after adding "1" to the evaluation value "12" of AGV3 at the previous counter value "t2", the evaluation value "9" of AGV2, which has the travel interfered with by AGV3, at the counter value "t3", and the evaluation value "3" of AGV1, which has the travel interfered with by AGV3, at the counter value "t3".

Counter Value "t4"

At the following counter value "t4", the calculation processing unit 114 calculates "4" as the evaluation value of AGV1. For example, because AGV1 is not interfering with the travel of the other AGVs, the calculation processing unit 114 calculates "4" as the evaluation value of AGV1, which is the value obtained after adding "1" to the evaluation value "3" of AGV1 at the previous counter value "t3".

Furthermore, at the counter value "t4", the calculation processing unit 114 calculates "14" as the evaluation value of AGV2. For example, because AGV2 is interfering with the travel of the other AGV1, the calculation processing unit 114 calculates "14" as the evaluation value, which is larger than the evaluation value of AGV1. Specifically, the calculation processing unit 114 calculates "14" as the evaluation value of AGV2, which is the value obtained after adding "1"

to the evaluation value "9" of AGV2 at the previous counter value "t3" and the evaluation value "4" of AGV1, which has the travel interfered with by AGV2, at the counter value "t4".

Moreover, at the counter value "t4", the calculation processing unit 114 calculates "44" as the evaluation value of AGV3. For example, because AGV3 is interfering with the travel of the other AVG2 and AGV1, the calculation processing unit 114 calculates "44" as the evaluation value, which is larger than the evaluation value of AGV2. Specifically, the calculation processing unit 114 calculates "44" as the evaluation value of AGV3, which is the value obtained after adding "1" to the evaluation value "25" of AGV3 at the previous counter value "t3", the evaluation value "14" of AGV2, which has the travel interfered with by AGV3, at the counter value "t4", and the evaluation value "4" of AGV1, which has the travel interfered with by AGV3, at the counter value "t4".

Counter Value "t5"

At the following counter value "t5", the calculation processing unit 114 calculates "5" as the evaluation value of AGV1. For example, because AGV1 is not interfering with the travel of the other AGVs, the calculation processing unit 114 calculates "5" as the evaluation value of AGV1, which is the value obtained after adding "1" to the evaluation value "4" of AGV1 at the previous counter value "t4".

Furthermore, at the counter value "t5", the calculation processing unit 114 calculates "20" as the evaluation value of AGV2. For example, because AGV2 is interfering with the travel of the other AGV1, the calculation processing unit 114 calculates "20" as the evaluation value, which is larger than the evaluation value of AGV1. Specifically, the calculation processing unit 114 calculates "20" as the evaluation value of AGV2, which is the value obtained after adding "1" to the evaluation value "14" of AGV2 at the previous counter value "t4" and the evaluation value "5" of AGV1, which has the travel interfered with by AGV2, at the counter value "t5".

Furthermore, at the counter value "t5", the calculation processing unit 114 calculates "70" as the evaluation value of AGV3. For example, because AGV3 is interfering with the travel of the other AVG2 and AGV1, the calculation processing unit 114 calculates "70" as the evaluation value, which is larger than the evaluation value of AGV2. Specifically, the calculation processing unit 114 calculates "70" as the evaluation value of AGV3, which is the value obtained after adding "1" to the evaluation value "44" of AGV3 at the previous counter value "t4", the evaluation value "20" of AGV2, which has the travel interfered with by AGV3, at the counter value "t5", and the evaluation value "5" of AGV1, which has the travel interfered with by AGV3, at the counter value "t5".

Counter Value "t6"

At the following counter value "t6", the calculation processing unit 114 calculates "6" as the evaluation value of AGV1. For example, because AGV1 is not interfering with the travel of the other AGVs, the calculation processing unit 114 calculates "6" as the evaluation value of AGV1, which is the value obtained after adding "1" to the evaluation value "5" of AGV1 at the previous counter value "t5".

Furthermore, at the counter value "t6", the calculation processing unit 114 calculates "27" as the evaluation value of AGV2. For example, because AGV2 is interfering with the travel of the other AGV1, the calculation processing unit 114 calculates "27" as the evaluation value, which is larger than the evaluation value of AGV1. Specifically, the calculation processing unit 114 calculates "27" as the evaluation value of AGV2, which is the value obtained after adding "1" to the evaluation value "20" of AGV2 at the previous counter value "t5" and the evaluation value "6" of AGV1, which has the travel interfered with by AGV2, at the counter value "t6".

Furthermore, at the counter value "t6", the calculation processing unit 114 calculates "104" as the evaluation value of AGV3. For example, because AGV3 is interfering with the travel of the other AVG2 and AGV1, the calculation processing unit 114 calculates "104" as the evaluation value, which is larger than the evaluation value of AGV2. Specifically, the calculation processing unit 114 calculates "104" as the evaluation value of AGV3, which is the value obtained after adding "1" to the evaluation value "70" of AGV3 at the previous counter value "t5", the evaluation value "27" of AGV2, which has the travel interfered with by AGV3, at the counter value "t6", and the evaluation value "6" of AGV1, which has the travel interfered with by AGV3, at the counter value "t6".

In this way, the calculation processing unit 114 updates the evaluation value of each of the AGVs 1 to 3 each time the counter value is updated during the deadlock. In the example of FIG. 8, because AGV2 is interfering with the travel of AGV1, the influence level that AGV2 imposes on the travel of AGV1 increases over time. Furthermore, because AGV3 is interfering with the travel of AGV1 and AGV2, the influence level that AGV3 imposes on the travel of AGV1 and AGV2 increases over time. Moreover, because AGV3 is interfering with the travel of two AGVs (AGV1 and AGV2), and AGV2 is interfering with the travel of one AGV (AGV1), the evaluation value of AGV3 becomes larger than the evaluation value of AGV2.

When the evaluation value calculated by the calculation processing unit 114 is greater than or equal to a threshold, the change processing unit 115 updates the travel route set to the automatic traveling device 2 by the setting processing unit 112. Specifically, the change processing unit 115 sets a detour route that is different from the travel route that is set to the automatic traveling device 2 (first AGV) by the setting processing unit 112. Note that the detour route is a route from the current stopped position to the destination location, and is a route that is different from the preset route.

In addition, when the first AGV is in the stopped state, the change processing unit 115 sets a retreat location that is different from the destination location of the first AGV, and sets a retreat route which leads to the retreat location. Note that the retreat route is a route from the current stopped position to a retreat location for temporarily retreating, and is a route that is different from the preset route.

For example, when the threshold of the evaluation value is set to "100", in the example illustrated in FIG. 9, the evaluation value of AGV3 becomes "104" at the counter value "t5" and becomes greater than or equal to the threshold. In this case, the change processing unit 115 changes the travel route set to AGV3 at the counter value "t5". Specifically, the change processing unit 115 sets the detour route of AGV3. Furthermore, the change processing unit 115 may set a retreat location that is different from the destination location of AGV3, and set a retreat route which leads to the retreat location.

When the change processing unit 115 changes the travel route, the traveling processing unit 113 outputs a travel instruction including the changed route information to AGV3. As a result, AGV3 travels along the changed route (such as a detour route or a retreat route) from the stopped position (for example, the pick-up location px in FIG. 8). When AGV3 moves from the stopped position, the deadlock state (see FIG. 8) is resolved, and AGV2 and AGV1 are capable of traveling along the travel route.

Here, when the evaluation value of a plurality of automatic traveling devices 2 becomes greater than or equal to the threshold, the change processing unit 115 changes the travel route set to each of the corresponding automatic traveling devices 2. For example, in the example illustrated in FIG. 8, when the evaluation value of each of AGV3 and AGV2 becomes greater than or equal to the threshold, the change processing unit 115 changes the travel route set to AGV3 and the travel route set to AGV2, respectively. Note that the change processing unit 115 may set a different route to each of AGV3 and AGV2.

As described above, the calculation processing unit 114 calculates the evaluation value for each of the plurality of automatic traveling devices 2, and the change processing unit 115 changes the travel route corresponding to the one or more automatic traveling devices which have the evaluation value greater than or equal to the threshold.

As another embodiment, the change processing unit 115 may change, among the plurality of automatic traveling devices 2 which have the evaluation value greater than or equal to the threshold, the travel route corresponding to the automatic traveling device 2 having the largest evaluation value. For example, in the example illustrated in FIG. 8, when the evaluation value of each of AGV3 and AGV2 is greater than or equal to the threshold, the change processing unit 115 may change the travel route for only AGV3, which has the higher evaluation value.

Furthermore, as another embodiment, the change processing unit 115 may specify, among the plurality of automatic traveling devices 2 which have the evaluation value greater than or equal to the threshold, an automatic traveling device 2 having a travel route that can be changed, and change the travel route corresponding to the specified automatic traveling device 2. For example, in the example illustrated in FIG. 8, when the evaluation value of each of AGV3 and AGV2 is greater than or equal to the threshold, if the travel route of AGV3 cannot be changed, that is, a detour route or a retreat route cannot be set to AGV3, the change processing unit 115 may change only the travel route of AGV2.

Traveling Processing

Figure 10:
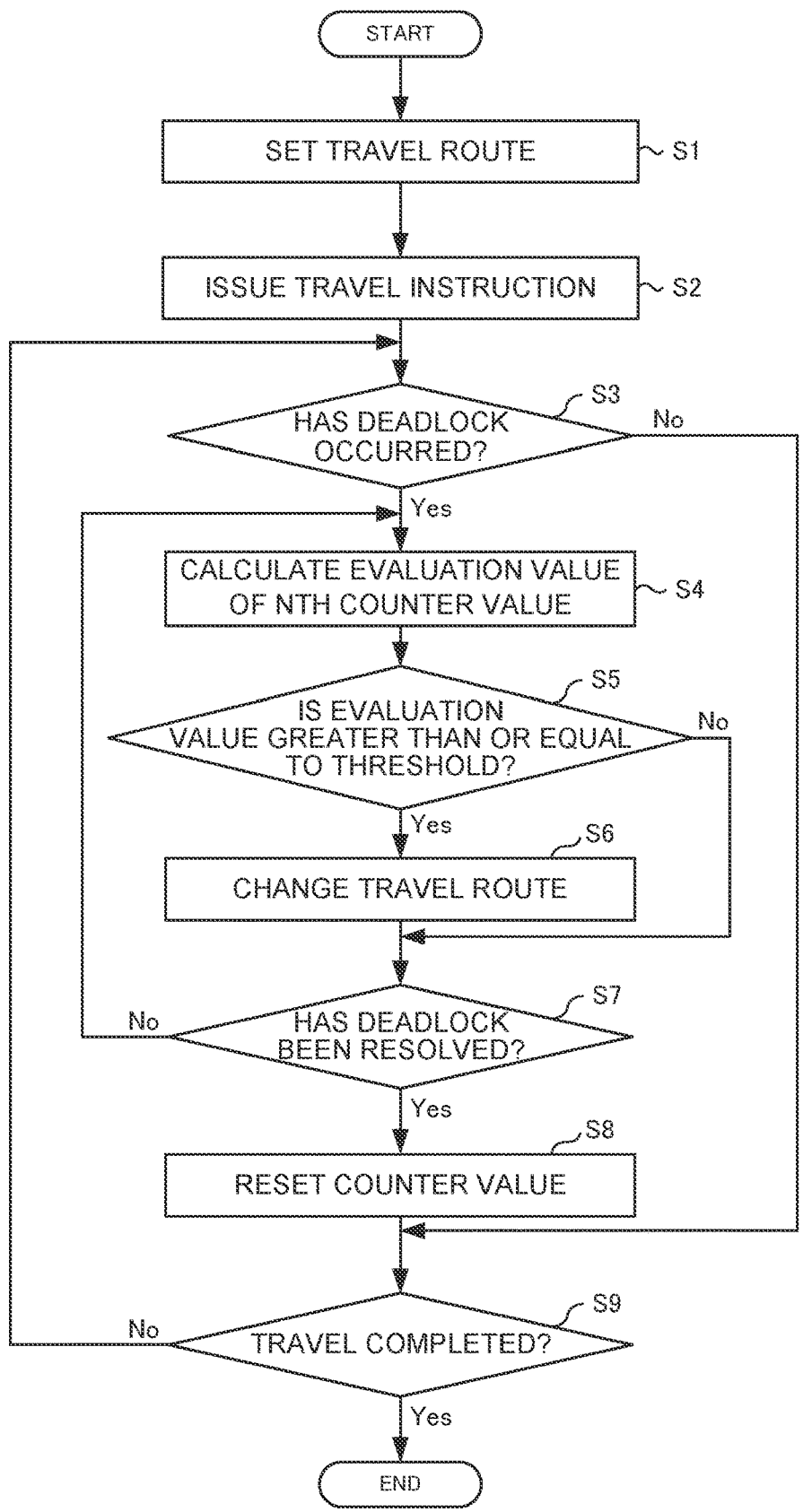
FIG. 10 is a flowchart illustrating an example of the procedure of traveling processing executed by the traveling system according to the embodiment of the present disclosure.

Hereinafter, the traveling processing executed by the traveling system 10 will be described with reference to FIG. 10. Specifically, in the present embodiment, the traveling processing is executed by the controller 11 of the management server 1. Furthermore, the controller 11 is capable of executing multiple instances of the traveling processing in parallel in response to a plurality of transport requests made with respect to the plurality of automatic traveling devices 2. The controller 11 starts executing the traveling processing shown in FIG. 10 upon causing the automatic traveling device 2 to start transport work in response to a transport request.

The present disclosure can be taken as disclosure of a traveling method for executing one or more steps included in the traveling processing. In addition, one or more steps included in the traveling processing described herein may be omitted as appropriate. The order of execution of the steps in the traveling processing may differ as long as the same operational effects are obtained. Further, although a case where the controller 11 executes the steps in the traveling processing is described herein as an example, a traveling method in which one or more processors execute the steps in the traveling processing in a distributed manner is also considered as another embodiment.

First, in step S1, the controller 11 sets a travel route with respect to each AGV. Specifically, the controller 11 generates the transport information D3 (see FIG. 5) based on the transport requests corresponding to the order information D2 (see FIG. 4), and sets a travel route with respect to each AGV according to the transport information D3.

Then, in step S2, the controller 11 outputs a travel instruction to each AGV. Specifically, the controller 11 starts the transport operation (automatic travel) by outputting travel route information and control information to each AGV. As a result, each of the plurality of AGVs start automatic travel along the set travel route.

Next, in step S3, the controller 11 determines whether or not a deadlock has occurred. For example, as shown in FIG. 8, when three AGVs 1 to 3 stop on the travel route, the controller 11 determines that a deadlock has occurred. When the controller 11 determines that a deadlock has occurred (S3: Yes), it shifts the processing to step S4. On the other hand, when the controller 11 determines that a deadlock has not occurred (S3: No), it shifts the processing to step S7.

In step S4 the controller 11 calculates the evaluation value of each AGV. Specifically, the controller 11 sets a counter value and calculates the evaluation value corresponding to each AGV 1 to 3 (see FIG. 9). For example, the controller 11 sets the counter value to "t1", and calculates the evaluation value "1" of AGV1, the evaluation value of "2" of AGV2, and the evaluation value "4" of AGV3.

Then, in step S5, the controller 11 determines whether or not the evaluation value is greater than or equal to a threshold. When the controller 11 determines that the evaluation value is greater than or equal to the threshold (S5: Yes), it shifts the processing to step S6. On the other hand, when the controller 11 determines that the evaluation value is less than the threshold (S5: No), it shifts the processing to step S7.

In step S7, the controller 11 determines whether or not the deadlock has been resolved. For example, in the example illustrated in FIG. 8, when AGV3 has moved from the stopped position (pick-up location px), the controller 11 determines that the deadlock has been resolved. When the controller 11 determines that the deadlock has been resolved (S7: Yes), it shifts the processing to step S8, resets the counter value in step S8, and then shifts the processing to step S9. On the other hand, when the controller 11 determines that the deadlock has not been resolved (S7: No), it shifts the processing to step S4. Returning to step S4, the controller 11 updates (increments) the counter value, and calculates the evaluation value corresponding to each AGV 1 to 3 at the next counter value (see FIG. 9).

When the evaluation value becomes greater than or equal to the threshold (S5: Yes), in step S6, the controller 11 changes the travel route set in step S2. For example, when the threshold of the evaluation value is set to "100", in the example illustrated in FIG. 9, the evaluation value of AGV3 becomes "104" at the counter value "t5" and becomes greater than or equal to the threshold (S5: Yes). In this case, the controller 11 changes the travel route set to AGV3 at the counter value "t5" (S6). For example, the controller 11 sets a detour route or a retreat route to AGV3.

Upon changing the travel route of AGV3, the controller 11 outputs a travel instruction to AGV3 that includes the route information of the changed travel route. As a result, AGV3 travels along the changed travel route. When AGV3 moves from the stopped position, AGV1 and AGV2 are capable of traveling along the travel route. After step S6, the controller 11 shifts the processing to step S7.

In step S7, the controller 11 determines whether or not the deadlock has been resolved. For example, in the example illustrated in FIG. 8, when AGV3 has moved from the stopped position (pick-up location px) by traveling along the changed travel route, the controller 11 determines that the deadlock has been resolved. When the controller 11 determines that the deadlock has been resolved (S7: Yes), it shifts the processing to step S8, resets the counter value in step S8, and then shifts the processing to step S9. On the other hand, when the controller 11 determines that the deadlock has not been resolved (S7: No), it shifts the processing to step S4. Returning to step S4, the controller 11 updates (increments) the counter value, and calculates the evaluation value corresponding to each AGV 1 to 3 at the next counter value (see FIG. 9). In this case, the AGV (for example, AGV2) which has the evaluation value that will next become greater than or equal to the threshold (S5: Yes) has the travel route changed by the controller 11 (S6).

In step S8, the controller 11 determines whether or not each AGV has completed travel along the travel route. For example, when each AGV has completed traveling processing corresponding to the transport request, the controller 11 determines that travel has been completed. When each AGV completes travel along the travel route, the controller 11 completes the traveling processing (S8: Yes). The controller 11 repeats the processing of steps S3 to S6 until each AGV completes travel along the travel route (S8: No).

As described above, the traveling system 10 according to the present embodiment is a traveling system that causes a plurality of automatic traveling devices to each travel to a destination location. Furthermore, the traveling system 10 sets a travel route corresponding to each of the plurality of automatic traveling devices, and when a first automatic traveling device interferes with the travel of other automatic traveling devices, calculates an evaluation value representing an influence level that the first automatic traveling device imposes on the travel of the other automatic traveling devices. Moreover, when the evaluation value is greater than or equal to a threshold, the traveling system 10 changes the travel route set to the first automatic traveling device.

According to the configuration described above, for example, when a deadlock occurs in which a plurality of automatic traveling device are stopped, the automatic traveling devices perform detour travel or retreat travel when the evaluation value becomes greater than or equal to a threshold. As a result, the deadlock can be resolved.

Note that the threshold may be set based on the scale (such as the number of automatic traveling devices or the area of the facility) in which the automatic traveling devices are installed. Furthermore, the threshold may be set according to the number of automatic traveling devices that are in the deadlock state. For example, the threshold may be set to a smaller value as the number of automatic traveling devices in the deadlock state increases, and set to a larger value as the number of automatic traveling device in the deadlock state decreases.

Supplementary Notes of Disclosure

An outline of the disclosure derived from the above embodiments will be described below as supplementary notes. The respective configurations and the processing functions described in the following supplementary notes can be selected to be added or omitted and combined arbitrarily.

Supplementary Note 1

A traveling system that causes a plurality of automatic traveling devices to each travel to a destination location, comprising:

a setting processing unit that sets a travel route corresponding to each of the plurality of automatic traveling devices;

a calculation processing unit that, when a first automatic traveling device interferes with a travel of other automatic traveling devices, calculates an evaluation value representing an influence level that the first automatic traveling device imposes on the travel of the other automatic traveling devices; and a change processing unit that, when the evaluation value calculated by the calculation processing unit is greater than or equal to a threshold, changes the travel route that is set to the first automatic traveling device by the setting processing unit.

Supplementary Note 2

The traveling system according to supplementary note 1, wherein the calculation processing unit calculates the evaluation value according to the number of other automatic traveling devices which have the travel interfered with by the first automatic traveling device.

Supplementary Note 3

The traveling system according to supplementary note 2, wherein the calculation processing unit calculates the evaluation value so as to increase as the number of other automatic traveling devices which have the travel interfered with by the first automatic traveling device increases.

Supplementary Note 4

The traveling system according to supplementary note 3, wherein the calculation processing unit, when the first automatic traveling device interferes with a travel of second automatic traveling devices, calculates the evaluation value according to the number of second automatic traveling devices.

Supplementary Note 5

The traveling system according to supplementary note 4, wherein the calculation processing unit, when the second automatic traveling devices, which have the travel interfered with by the first automatic traveling device, further interfere with a travel of third automatic traveling devices, calculates the evaluation value according to the number of second automatic traveling devices and third automatic traveling devices.

Supplementary Note 6

The traveling system according to any one of supplementary notes 1 to 5, wherein the change processing unit sets a detour route that is different from the travel route that is set to the first automatic traveling device by the setting processing unit.

Supplementary Note 7

The traveling system according to any one of supplementary notes 1 to 6, wherein the change processing unit, when the first automatic traveling device is in a stopped state, sets a retreat location that is different from the destination location of the first automatic traveling device, and sets a retreat route which leads to the retreat location.

Supplementary Note 8

The traveling system according to any one of supplementary notes 1 to 7, wherein the calculation processing unit calculates the evaluation value for each of the plurality of automatic traveling devices, and the change processing unit changes the travel route corresponding to one or more automatic traveling devices which have the evaluation value greater than or equal to the threshold.

Supplementary Note 9

The traveling system according to any one of supplementary notes 1 to 8, wherein
the change processing unit changes, among a plurality of automatic traveling devices which have the evaluation value greater than or equal to the threshold, the travel route corresponding to an automatic traveling device having the largest evaluation value.

Supplementary Note 10

The traveling system according to any one of supplementary notes 1 to 9, wherein
the change processing unit specifies, among a plurality of automatic traveling devices which have the evaluation value greater than or equal to the threshold, an automatic traveling device having a travel route that can be changed, and changes the travel route corresponding to the specified automatic traveling device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A traveling system comprising a management server and a plurality of automatic traveling devices, the management server receiving a signal, that includes order information, from at least one terminal, storing the order information in a storage device, and transmitting another signal to each automatic traveling device of the plurality of automatic traveling devices to carry at least one item, included in the order information, from a source location to a destination location, the management server comprising:
    a setting processing circuit that sets a travel route for each of the plurality of automatic traveling devices;
    a calculation processing circuit that calculates an evaluation value representing an influence level that a first automatic traveling device, among the plurality of automatic traveling devices, imposes on travels of a second automatic traveling device and a third automatic traveling device, among the plurality of automatic traveling devices, when:
        the first automatic traveling device stops at a first location on a first travel route which leads to a first destination location, the first location included in a second travel route which leads to a second destination location of the second automatic traveling device,
        the second automatic traveling device stops at a second location preceding the first location on the second travel route, the second location included in a third travel route which leads to a third destination location of the third automatic traveling device, and
        the third automatic traveling device stops at a third location preceding the second location on the third travel route; and
    a change processing circuit that, when the evaluation value calculated by the calculation processing circuit is greater than, or equal to, a threshold, changes the first travel route, that is set for the first automatic traveling device by the setting processing circuit, to a detour route that is different from the first travel route and that leads to the first destination location.

2. The traveling system according to claim 1, wherein the evaluation value increases as a number of automatic traveling devices increases.

3. The traveling system according to claim 1, wherein the change processing circuit, when the first automatic traveling device is in a stopped state:
    sets a retreat location that is different from the first destination location of the first automatic traveling device, and
    sets a retreat route which leads to the retreat location.

4. The traveling system according to claim 1, wherein the calculation processing circuit calculates the evaluation value for each of the plurality of automatic traveling devices, and
the change processing circuit changes one or more travel routes for one or more automatic traveling devices, respectively, which have evaluation values that are greater than, or equal to, the threshold.

5. The traveling system according to claim 1, wherein among one or more of the plurality of automatic traveling devices that have evaluation values greater than, or equal to, a threshold, the change processing circuit changes a travel route of an automatic traveling device that has a largest evaluation value.

6. The traveling system according to claim 1, wherein among two or more automatic traveling devices of the plurality of automatic traveling devices that have evaluation values greater than, or equal to, a threshold, an automatic traveling device has a travel route that is changeable and another automatic traveling device has a travel route that is not changeable, and
the change processing circuit changes the travel route of the automatic traveling device for which the travel route is changeable.

7. A traveling method performed by a traveling system comprising a management server and a plurality of automatic traveling devices, the management server receiving a signal, that includes order information, from at least one terminal, storing the order information in a storage device, and transmitting another signal to each automatic traveling device of the plurality of automatic traveling devices to carry at least one item, included in the order information, from a source location to a destination location, the traveling method comprising:
    setting a travel route for each of the plurality of automatic traveling devices;
    calculating an evaluation value representing an influence level that a first automatic traveling device, among the plurality of automatic traveling devices, imposes on travels of a second automatic traveling device and a third automatic traveling device, among the plurality of automatic traveling devices, when:
        the first automatic traveling device stops at a first location on a first travel route which leads to a first destination location, the first location included in a second travel route which leads to a second destination location of the second automatic traveling device,
        the second automatic traveling device stops at a second location preceding the first location on the second travel route, the second location included in a third travel route which leads to a third destination location of the third automatic traveling device, and the third automatic traveling device stops at a third location preceding the second location on the third travel route; and changing, when the evaluation value is greater than, or equal to, a threshold, the first travel route for the first automatic traveling device to a detour route that is different from the first travel route and that leads to the first destination location.

8. The traveling system according to claim 1, wherein the plurality of automatic traveling devices is equipped with a plurality of containers, each for holding an item included in the order information.

9. A traveling system comprising a management server and a plurality of automatic traveling devices, the management server receiving a signal, that includes order information, from at least one terminal, storing the order information in a storage device, and transmitting another signal to each automatic traveling device of the plurality of automatic traveling devices to carry at least one item, included in the order information, from a source location to a destination location, the management server comprising:

a setting processing circuit that sets a travel route for each of the plurality of automatic traveling devices;

a calculation processing circuit that calculates an evaluation value representing an influence level that a first automatic traveling device, among the plurality of automatic traveling devices, imposes on travels of a second automatic traveling device and a third automatic traveling device, among the plurality of automatic traveling devices, when:

the first automatic traveling device stops at a first location on a first travel route which leads to a first destination location, the first location included in a second travel route which leads to a second destination location of the second automatic traveling device, the second automatic traveling device stops at a second location preceding the first location on the second travel route, the second location included in a third travel route which leads to a third destination location of the third automatic traveling device, and the third automatic traveling device stops at a third location preceding the second location on the third travel route; and a change processing circuit that, when the evaluation value calculated by the calculation processing circuit is greater than, or equal to, a threshold, changes the first travel route, that is set for the first automatic traveling device by the setting processing circuit, to a detour route that is different from the first travel route and that leads to the first destination location.

* * * * *